United States Patent [19]

Steinwandel et al.

[11] Patent Number: 5,397,555
[45] Date of Patent: Mar. 14, 1995

[54] PROCESS FOR REDUCING CARBON PARTICLES IN EXHAUST GAS FLOWS

[75] Inventors: Jürgen Steinwandel, Uhldingen; Rainer Willneff, Markdorf; Martin Ströer, Friedrichshafen; Theodor Staneff, Bermatingen, all of Germany

[73] Assignee: Dornier GmbH, Germany

[21] Appl. No.: 141,741

[22] Filed: Oct. 27, 1993

[30] Foreign Application Priority Data

Oct. 27, 1992 [DE] Germany ............... 42 36 242.3

[51] Int. Cl.⁶ .................. C01B 31/00; B01D 53/32
[52] U.S. Cl. ................. 423/215.5; 423/DIG. 10; 423/445 R; 204/157.3; 204/157.43
[58] Field of Search ............. 204/164, 157.3, 157.43, 204/157.47; 423/210, 215.5, DIG. 10, 445 R

[56] References Cited

U.S. PATENT DOCUMENTS

| | | | |
|---|---|---|---|
| 4,780,277 | 10/1988 | Tanaka et al. | 422/4 |
| 4,883,570 | 11/1989 | Efthimion et al. | 204/164 |
| 4,934,141 | 6/1990 | Ohlron et al. | 60/275 |
| 5,038,111 | 8/1991 | Lo | 328/333 |
| 5,172,083 | 12/1992 | Hidaka et al. | 333/93 L |
| 5,256,265 | 10/1993 | Cha | 204/157.3 |
| 5,269,892 | 12/1993 | Cha | 204/157.3 |
| 5,979,193 | 9/1976 | Sikich | 55/123 |

*Primary Examiner*—Gary P. Straub
*Assistant Examiner*—Timothy C. Vanoy
*Attorney, Agent, or Firm*—Evenson, McKeown, Edwards & Lenahan

[57] ABSTRACT

A process for the continuous removal of carbon particles in exhaust gas flows uses a plasma process. A stationary oxidative plasma process achieves a particle burn-up of the excess oxygen in technical combustion processes.

8 Claims, 7 Drawing Sheets

PROCESS FOR REDUCING CARBON PARTICLES IN EXHAUST GAS FLOWS

BACKGROUND AND SUMMARY OF THE INVENTION

Carbon particles such as inorganic constituents, graphitic C-constituents as well as higher aliphatic, alicyclic and aromatic hydrocarbons, may occur during all technical combustion processes with carbon-carrying compounds.

Particularly serious problems occur in the case of diesel engine particle emissions because of the content of higher-molecular hydrocarbons as well as polycondensed aromatic compounds, the problems can range from being a health risk to possibly causing cancer, for example, from 3,4 benzpyrene and nitro aromatic compounds.

According to past experience, in the case of diesel combustion engines, engine-related measures are not sufficient for clearly reducing the emitted mass of black. These measures are impaired by the difficulty that, as a rule, a particle reduction by means of engine-related measures results in an increase of the $NO_x$-emission (essentially NO), for example, by an increase of the relevant combustion chamber temperatures.

It is therefore necessary to achieve a particle reduction by means of measures taking place behind the engine. Mainly, attempts are made to combat the problem by installing particle filters into the exhaust gas duct.

Because of the black depositing process, the filter will become increasingly clogged over time which leads to a considerable increase of the exhaust backpressure (filter backpressure) and thus to a reduction of the engine output.

In the case of technical combustion processes, e.g. a combustion process of any natural fuel with atmospheric air, with a high air excess (for example, diesel engines), the oxygen free concentration in the exhaust gas will basically be sufficient for being able to cause the burning of the oxidizable black constituents. In this case, the absolute thermodynamic equilibria in the case of all exhaust gas conditions in question (black concentrations, partial oxygen pressure, overall pressure, temperature) are found in the direction of the quantitative oxidation to carbon dioxide and water. Because of reaction-kinetic criteria (activation energy for the ignition of black), in the case of black-loaded particle filters, the thermodynamically advantageous conditions are implemented without any additional measures starting only at approximately 600° C. to a sufficiently rapid degree. As a rule, these temperatures are not available in diesel engine exhaust gases (and also in other technical combustions). One possibility for igniting the black on the particle filters consists of heating the filter, for example, by means of external burners, electrical resistance heating of the filter, and electromagnetic filter heating via high-frequency fields.

Currently, all of the above-mentioned methods are more or less in advanced development stages.

Another possibility exists in that the ignition temperature of filter-adsorbed black is either by means of correspondingly catalytic active substances (applied as a filter coating/filter impregnation) or by chemical promoters (additives in the fuel or separate injecting into the exhaust gas duct in front of the particle filter) lowered to such an extent that the normally utilizable exhaust gas temperatures, i.e., approximately 200° C.–450° C., will be sufficient for the complete burning-off of black.

So far, useful solutions based on particle filter systems have not been successfully implemented.

Because of the thus far largely negative experiences with filter systems (particularly concerning the special requirements in the case of diesel engines of passenger cars and commercial vehicles), the development of no-filter particle reduction processes is of particular importance.

In this context, a non-reactive process, developed by Robert Bosch GmbH of Stuttgart, Germany, is known, wherein carbon particles, after a preceding gas phase agglomeration (such as, an electrostatic charging) by means of a gasdynamic centrifugal precipitation, i.e., cyclone, are precipitated into a collecting vessel.

It is therefore an object of the present invention to provide a process for reducing carbon particles in exhaust gas flows.

An object of the invention consists of the direct oxidative conversion of carbon particles in the oxygenous medium of a free exhaust gas flow in a high-frequency-induced stationary plasma zone. Because of the presence of high-energy particles in the plasma (ions/electrons; electronically, vibronically and rotatorily excited ions or neutral molecules, activated carbon particles), the reaction-kinetic inhibitions (with respect to normal oxidation of carbon particles by means of molecular oxygen) are eliminated, i.e., there is extensive reduction of the activation energies. This results in a sequence of shock-controlled homogeneous gas reactions with high effective reaction rates.

With respect to the technical applicability of the process for exhaust gas systems, typical high-pressure plasmas (p>1 bar) are required.

When plasma is produced by means of high-frequency fields, in the case of non-magnetic materials, the coupling-in of the high-frequency energy depends on the complex relative permittivity of the material:

$$\epsilon = \epsilon' + i\epsilon'' \tag{1}$$

or on the dielectric loss angle:

$$\tan \delta = \epsilon''/\epsilon' \tag{2}$$

wherein $\epsilon$ is a function of the temperature and of the frequency.

The volume-specific absorption of HF-energy in the interior of an HF-absorbing material is given by:

$$P_{abs} = \pi \nu \epsilon' \tan \delta |E|^2 \tag{3}$$

wherein $\nu$ is the frequency and E is the mean electric field intensity in the absorbing volume:

$$\epsilon_0 = 8{,}859 \cdot 10^{-12} \text{ Asec/Vm}.$$

For matter whose losses are defined predominantly by the electric conducting capacity, the following applies:

$$\epsilon'' = \sigma/2\pi \cdot \nu \tag{4}$$

wherein $\sigma$ is the electric conducting capacity in $(\Omega m)^{-1}$. Therefore, the following is obtained for the convertible dissipated energy density:

$$P_{abs} = \frac{\sigma}{2} |E|^2 \qquad (5)$$

The electromagnetic field which penetrates into an absorbing volume is weakened by absorption. As a result, depending on the matter and frequency of the electromagnetic field, a limited penetration depth $d_c$ is obtained:

$$d_c = c/2\pi v \left( \frac{2 \cdot \epsilon_o}{\epsilon'((1 + \tan^2\delta)^{\frac{1}{2}} - 1)} \right)^{\frac{1}{2}} \qquad (6)$$

wherein $c = 3 \cdot 10^8$ m/sec, that is, the velocity of light.

When plasma is produced by high-frequency energy, a differentiation should be made between the process of plasma ignition and the process of maintaining a stationary plasma.

In the case of gases, the electrical conducting capacity is low so that comparatively high local field intensities are required for the plasma ignition or breakdown. In air, such breakdown field intensities are between 10–25 kV/cm.

However, as soon as such a plasma breakdown had been implemented, the relevant electromagnetic substance characteristics changed drastically (for example, the complex refractive index e mainly in the shape of the imaginary part and therefore according to (4) the conducting capacity $\sigma$).

In particular, the conducting capacity $\sigma$ changes on the basis of the presence of free charge carriers by several powers of ten.

The electrical conducting capacity of a fully ionized plasma (full thermodynamic equilibrium (VTG) or local thermodynamic equilibrium (LTG) may be derived in a general form from Boltzmann's impact equation with the assumption of an ideal Lorentz gas, i.e., fully ionized gas with no electron interaction and stationary ions.

The following is obtained:

$$\sigma = 0{,}58 \frac{64 \, (2\pi)^{1/2} \, \epsilon_o^2 \, k_B^{3/2}}{e_o^2 \, (m_{el})^{1/2} \ln A} T^{3/2} \qquad (7)$$

$$A = \frac{12 \, \pi \, (\epsilon_o k_B)^{3/2}}{e_o^3} T^{3/2} N_{el}^{-1/2} \qquad (8)$$

$e_o$: electrical elemental charge;
$m_{el}$: electron mass;
$N_{el}$: particle density electrons.

In the case of VTG conditions and LTG conditions, the Saha-Eggert Equation applies to $N_{el}$:

$$\frac{N_{el} N_i^+}{N_a} = 2 \frac{Z_i(T)}{Z_a(T)} \frac{(2\pi m_{el} k_b^{3/2})}{h^3} \cdot T^{3/2} \exp(-E_i/k_B T) \qquad (9)$$

$N_i^+$: particle density ions,
$N_a$: particle density neutral gas molecules,
$Z_{i,a}$: system condition sums,
$E_i$: ionization energy.

The temperature-dependent electric conducting capacities of VTG plasmas and LTG plasmas are determined mainly by the impact cross-sections between free electrons. They are therefore proportional to the number density $N_{el}$ of the free electrons.

The presence of considerable concentrations of free charge carriers, after the plasma ignition has taken place, finally influences the further action of the stationary plasma with respect to the coupling-in (maintaining the plasma condition) of high-frequency power.

The question therefore arises concerning the propagation possibility of electromagnetic waves in a fully ionized plasma.

Many different types of electromagnetic waves may form in such media because of different characteristics of the electron gas and ion gas as well as the following acceleration-effective processes:

Electrostatic (Coulomb) forces
Magnetic (Lorentz) forces
Forces resulting from viscosities (Stokes forces)
Forces resulting from pressure gradients.

For the special case of an exclusive Coulomb interaction without a stationary magnetic field with the additional marginal conditions of vanishing damping, $\sigma \to \infty$, charge maintenance and quasi-neutrality in the plasma, the following applies to flat electromagnetic waves:

$$\Delta E - \omega_p^2/c^2) \, E - \frac{1}{c^2} \, \partial^2 E/\partial t^2 = 0 \qquad (10)$$

with the dispersion relation:

$$\omega_p = (N_{el} e_o^2/(m_{el} \epsilon_o))^{\frac{1}{2}} \qquad (11)$$

$\omega_p$ is the characteristic plasma (Langmuir) frequency.

Accordingly, transverse electromagnetic waves can propagate in a stationary plasma only if $\omega > \omega_p$. For $\omega < \omega_p$, there is a cut-off because of total reflection of the incoming electromagnetic waves (no further HF-energy absorption), and the plasma condition will break down.

Example

In the case of a VTG/LTG nitrogen plasma with the use of a high frequency of 2.46 GHz (domestic microwave magnetron), electromagnetic waves of this frequency ($\omega_p$) can no longer propagate starting at approximately $7{,}5 \cdot 10^{10}$ cm$^{-3}$ of free electron concentration. This corresponds to a plasma temperature of approximately 5,000° K.

In the presence of stationary electric and magnetic fields, additional possibilities for absorptive plasma conditions (in expansion with respect to (11)) are opened up. In the particularly important case of the transmission of stationary magnetic fields of induction B, these are the conditions of the electron and ion cyclotron frequencies.

Based on the definition of the Lorentz force ($F_L = [v \times B]$) and its effect as a centrifugal force ($F_L = m v^2/r$), the following is obtained in general for the gyration frequencies:

$$\omega_g = v/r = e_o/m) \cdot B \qquad (12)$$

(in the case of a simple ionization), wherein
  $m = m_{el}$: electron cyclotron resonance
  $m = m_{Ion}$: ion cyclotron resonance For the example of the plasma generating frequency of 2.46 GHz (see above), the necessary induction B is calculated at 0.0876 Tesla (T) for electron cyclotron resonance.

This results in additional possibilities for maintaining the plasma, should in fact the Langmuir criterion (11) prevent a further wave propagation in the plasma.

The above-mentioned electrodynamic criteria for the plasma ignition/plasma maintenance by means of high frequency can be technically implemented as follows. When typical radio frequencies (RF, approximately 10–100 MHz) are used, high field intensities E are, as a rule, generated by inductive coupling by a coil comprising the sample volume as the component of a radio frequency resonant circuit (inductively coupled plasma—ICP).

In principle, a capacitive coupling-in of the radio frequency is also possible, in which case the sample volume is closed off by a capacitor.

When typical microwave frequencies (microwave GHz-range) are used, the electromagnetic waves are, as a rule, guided by way of wave guides. The high frequency generation takes place either by means of magnetron systems (for example, standard microwave technology 2.46 GHz) or by means of travelling wave tubes (such as klystrons, frequencies above 10 GHz in the high power range, continuous wave radar, pulse radar).

For generating high field intensities in plasma applications, the following configurations are possible:

field concentration (E-vector) in rectangular wave guide systems, for example, R26 for 2.46 GHz-technology ($H_{10}$-geometry), i.e., standard technology. Additional field concentrations in the wave guide by capacitively operating stubs.

excitation of electric or magnetic fundamental modes (such as $E_{010}$, $H_{111}$) or higher modes in cavity resonators (cylindrical).

In both cases, it is basically possible to achieve the primary breakdown field intensity required for a stationary production of plasma.

Furthermore, it is possible to lower the electric field intensities required for the plasma breakdown by an increase of the gas conducting capacity $\sigma$, for example, by the feeding of electrons/ions by way of a suitable arrangement, such as a pilot flame, field emission, auxiliary plasma by way of corona discharge or arc/spark discharge.

Another possibility consists of superimposing, for the plasma ignition, i.e., breakdown, a short-time high-frequency pulse (having a pulse width of approximately 1 msec) on the stationary excitation field.

The embodiments described in the following for the particle reduction in black-loaded stationary exhaust gas flows by means of a high-frequency induced plasma are based on 2.46 GHz microwave technology.

Other objects, advantages and novel features of the present invention will become apparent from the following detailed description of the invention when considered in conjunction with the accompanying drawings.

DETAILED DESCRIPTION OF THE DRAWINGS

For the plasma production by means of microwave frequencies (for example, 2.46 GHz), the following steps are necessary:

Generating microwave radiation and coupling this radiation into a wave guide;

Conducting the wave in the wave guide; and

Coupling-out the wave into the plasma reaction gas.

For generating microwaves in the frequency band of 2.46 GHz, low-price and ruggedly constructed magnetrons of up to 5 kW high-frequency power are available. Higher powers require expensive cooling systems. As a rule, wave guides are used for conducting the microwaves. Because their geometry must be precisely defined, these permit only very specific wave types.

Rectangular Wave Guide Concept.

The dimensions of the wave guide system are decided with respect to the basic wave propagation possibility in the case of a given frequency.

There are transverse-electric ($E_{mn}$) and transverse-magnetic ($H_{mn}$) waves. The indices m, n indicate the number of wave maxima (amplitudes) in the X- and Y-directions. The most stable wave form in a rectangular waveguide is the so-called $H_{10}$-wave. This wave has the largest critical wavelength (critical wavelength $\lambda_k$). The wave guide can therefore be dimensioned such that no propagation of another wave type is possible.

The critical wavelength is calculated as follows:

$$\pi_k = 2/1[(m/a)^2 + (n/b)^2]^{\frac{1}{2}} \tag{65}$$

The following applies to the $H_{10}$-wave (m=1, n=0)

$$\lambda_k = 2 \cdot a \tag{66}$$

Normally, low-attenuation rectangular wave guide systems have a width to height ratio of a/b=2.

In addition, it should be observed that the wave guide wavelength $\lambda_H$ is larger than the free-space wave length $\lambda_o$. Without losses, the following applies:

$$\lambda_H = \lambda_o/[(1 - \lambda_o/\lambda_k)^2]^{\frac{1}{2}} \tag{67}$$

For 2.46 GHz, a wave guide wavelength (R26) of the $H_{10}$ fundamental mode of 171.97 mm is therefore obtained.

For the construction of a wave guide for stationary plasma experiments, the following physical marginal conditions are also important:

The coupling-out of the microwave should take place in a maximum of the E-field;

For the precision alignment, stubs are required at a defined distance in the wave guide.

Figure 1:
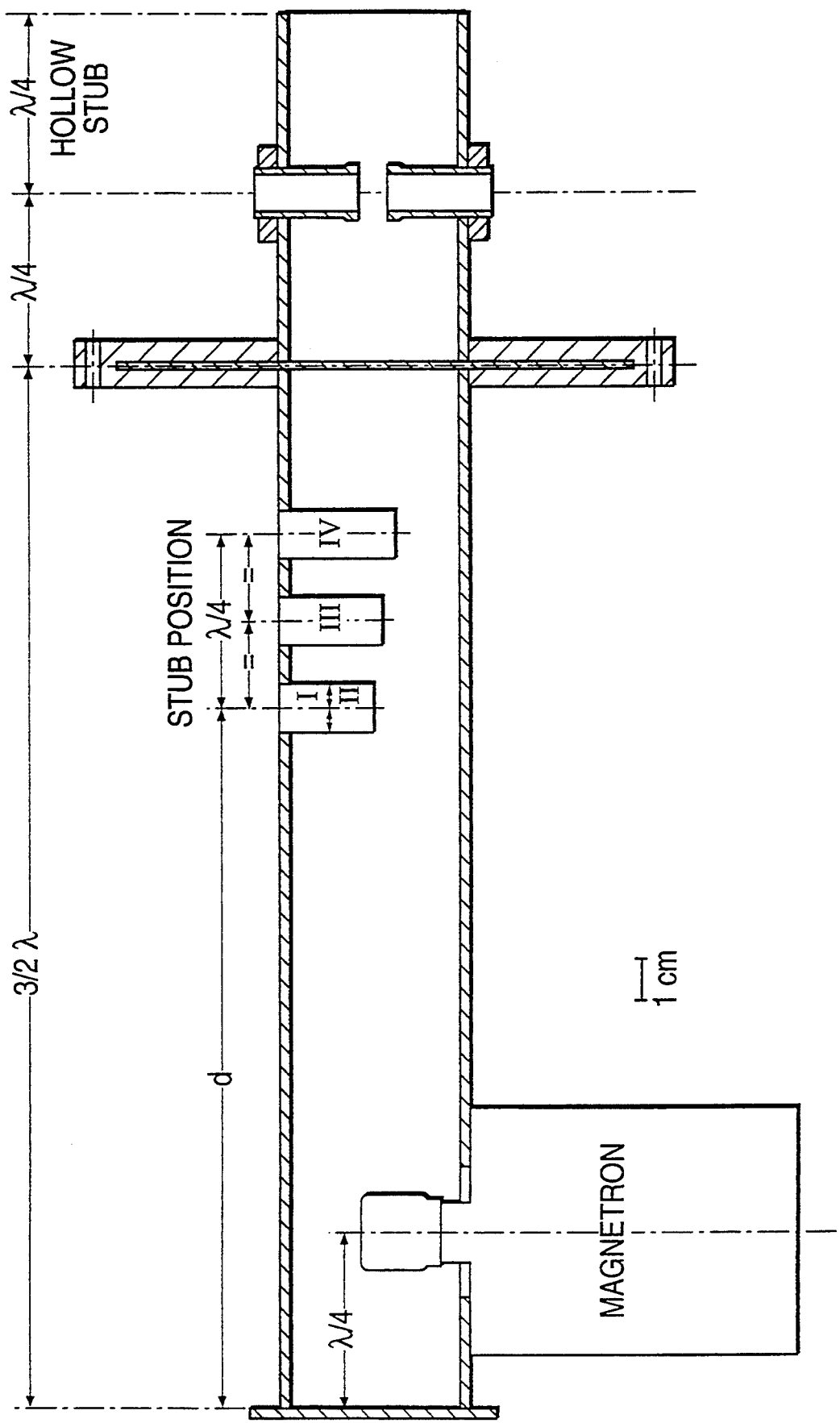
FIG. 1 is a cross-sectional view of an embodiment of a wave guide system.

FIG. 1 shows the version of an R26-wave guide system which was found to be suitable for the production of stationary plasmas.

The width a of the wave guide is 86.36 mm; the height b is 43.18 mm.

The length measurements are illustrated in FIG. 1. The coupling-out of the microwave into the plasma reaction gas takes place capacitively by two hollow stubs $\lambda_h/4$ in front of the open end of the wave guide. The reaction tube extends through the hollow stub.

Cavity Resonator Concept

The field intensity required for the ignition of a plasma in the exhaust gas flow may also be achieved in cavity resonators at atmospheric pressure. Although basically any shapes and modes are possible, the $E_{010}$-mode of the cylindrical resonator seems particularly suitable because of the field distribution.

The natural frequency of a cylindrical resonator with the radius R in the $E_{010}$-mode is independent of its length given by:

$$\nu = 2.405c/2\pi R$$

In the case of a resonance frequency of 2.46 GHz, this results in a radius of 47 mm. The Q at power adaptation (half the unloaded Q) is calculated at:

$$Q = (\sigma/\pi\epsilon_0\nu)^{\frac{1}{2}} 2.405/(4*(1+R/L))$$

In order to operate the fundamental mode in a stable manner, the length L may maximally be 2R. In this case, the quality Q=7,750 is obtained for a brass resonator.

Figure 2A:
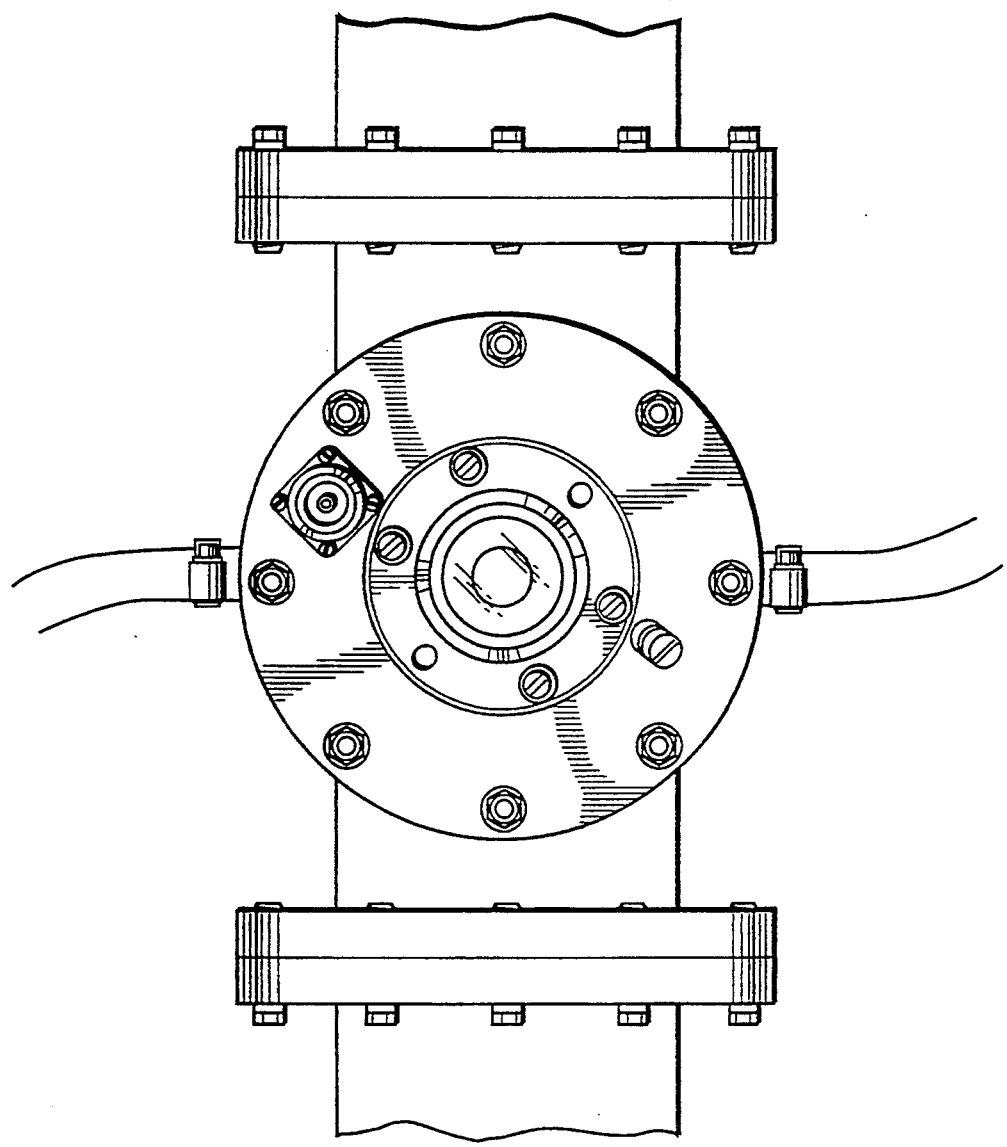
FIG. 2a is a photograph of a plasma in the exhaust gas of an acetylene burner.

From the quality and the dissipated energy $P_d$ in the resonator, the maximal field intensity according to:

$$E^2 = 2Z_0/(2.405\pi\mu J_1^2(2.405)) \, QP_d/LR$$

may be calculated. Thus, an approximately fifty-fold field exaltation is achieved with respect to the R26 wave guide (at 800 W dissipated energy, approximately 9 kV/cm). Experiments have proven that this field intensity is sufficient in order to ignite a plasma in the exhaust gas of an acetylene burner and to operate it in a stable manner (FIG. 2a).

Figure 2B:
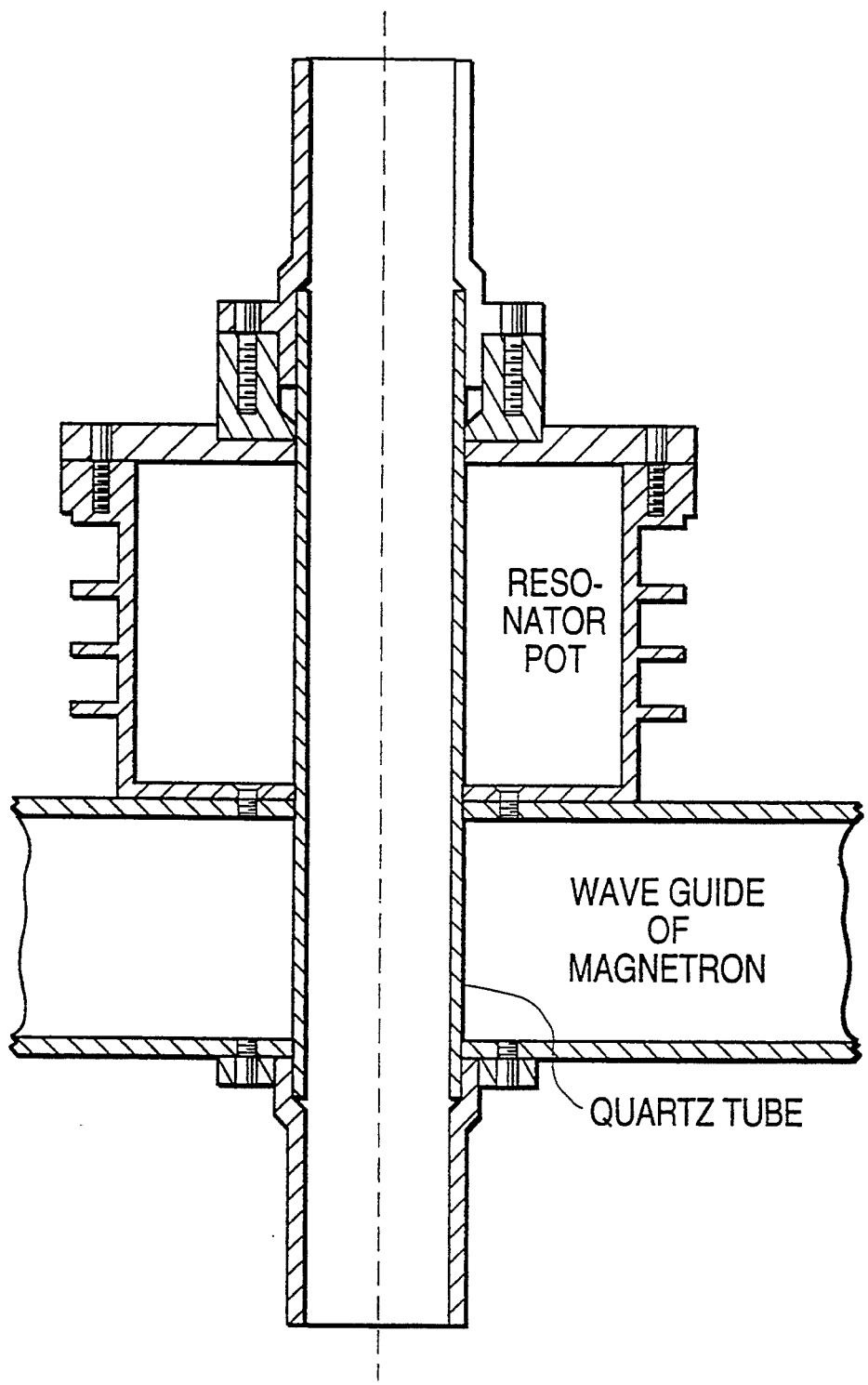
FIG. 2b is a cross-sectional view of a resonator.

The excitation of the resonator may basically take place by way of antennas (inductive or capacitive) or by coupling holes. A preferred arrangement is illustrated in FIG. 2b. In this case, a central circular-hole screen which is in each case mounted in both faces is used for the excitation of the resonator as well as for guiding the exhaust gas. In order to avoid contaminations of the resonator, the gas is guided through a pipe with low microwave absorption (quartz, teflon, etc . . . ). The position and the dimensioning of the coupling hole are important for the power adaptation.

Proof of Operating Principle

For the proof of the basic operating principle of the plasma-induced oxidation of particles, a synthetic exhaust gas of the following composition was first used:
90% nitrogen
10% oxygen
Acetylene black The synthesis black was produced continuously by means of a special acetylene burner. In this manner, it was possible to clearly achieve higher particle concentrations than normally available, for example, in the case of diesel engines.

As a result, it was possible to visually prove the basic method of operation (Example: Plasma formation in a 2.46 GHz-R26 rectangular wave guide).

Figure 3:
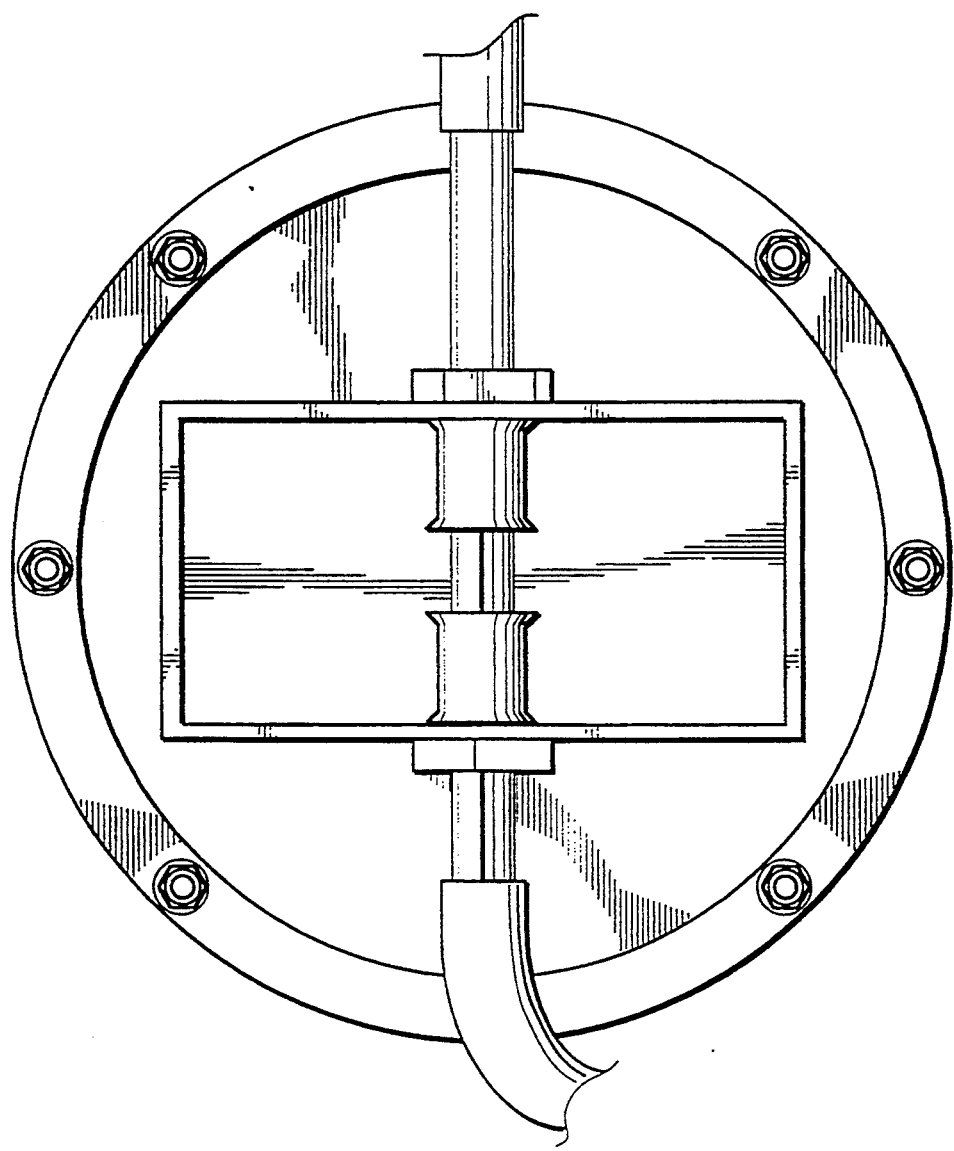
FIG. 3 is a view of a cavity resonator with the plasma zone.

The visual proof of the principle effect is illustrated in FIG. 3.

The exhaust pipe is guided through the open R26 wave guide at the point of maximal electrical field intensity. The guiding takes place coaxially through metallic hollow cylinders (capacitive coupling) for the increase of the field intensity for the plasma breakdown. In FIG. 3, the flow direction of the exhaust gas is downward.

In the upper inlet, the particle loading of the exhaust gas can be recognized. In the discharge pipe behind the plasma zone, there is no visually detectable particle loading.

Particle Reduction in the Exhaust Gas of a Diesel Engine

A 300 $cm^3$ single-cylinder direct-injection engine with a maximal wave output of 4.2 kW was used at 3,000 $min^{-1}$.

Load variations can be implemented by way of a wave-coupled single-phase A.C. generator with an electronically variable load.

The carbon particle determination in the exhaust gas in front of and behind the plasma zone was carried out by means of the method of the blackening number (TÜV (Technical Control Association)—approved photometric process of Robert Bosch GmbH Stuttgart, Germany).

Other volatile exhaust gas constituents were determined by way of an on-line FTIR (Fourier Transform Infrared) analysis, i.e., a hot gas measurement with a 1 m long-way gas cell at 185° C.

The absolute volume flow measurement also takes place by way of the FTIR-spectrometer by means of the method of chemically inert tracer gases. In the present case, carbon tetrafluoride ($CF_4$) was used. The absolute adjustment of the semiquantitative blackening number method (correlated with the emitted particle mass with the blackening number) was carried out gravimetrically by use of ceramic monolith particle filters (Corning Glass) for different stationarily driven load conditions of the diesel engine.

Figure 4:
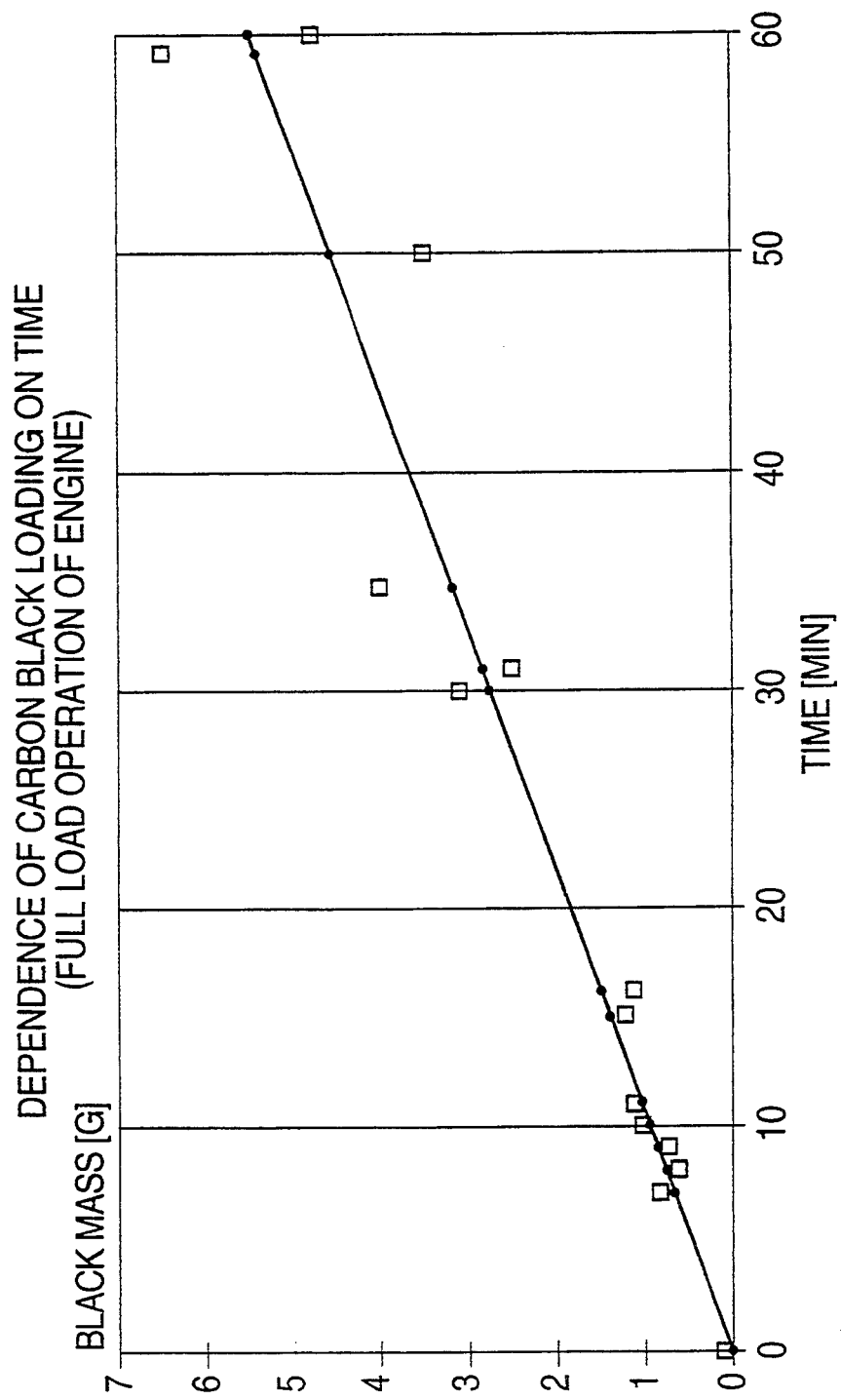
FIG. 4 is a diagram of the dependence of the black load on the time, at full-load operation of the engine.

As an example, FIG. 4 shows the dependence of the filter loading on the loading time for full-load conditions of the engine.

From the measured filter loading as well as taking into account the filter retaining rate (approximately 85% for Corning Glass cordierite monolith filters), a particle mass of 0.35 g/$Nm^3$ which is freely emitted at full-load conditions is obtained.

Figure 5:
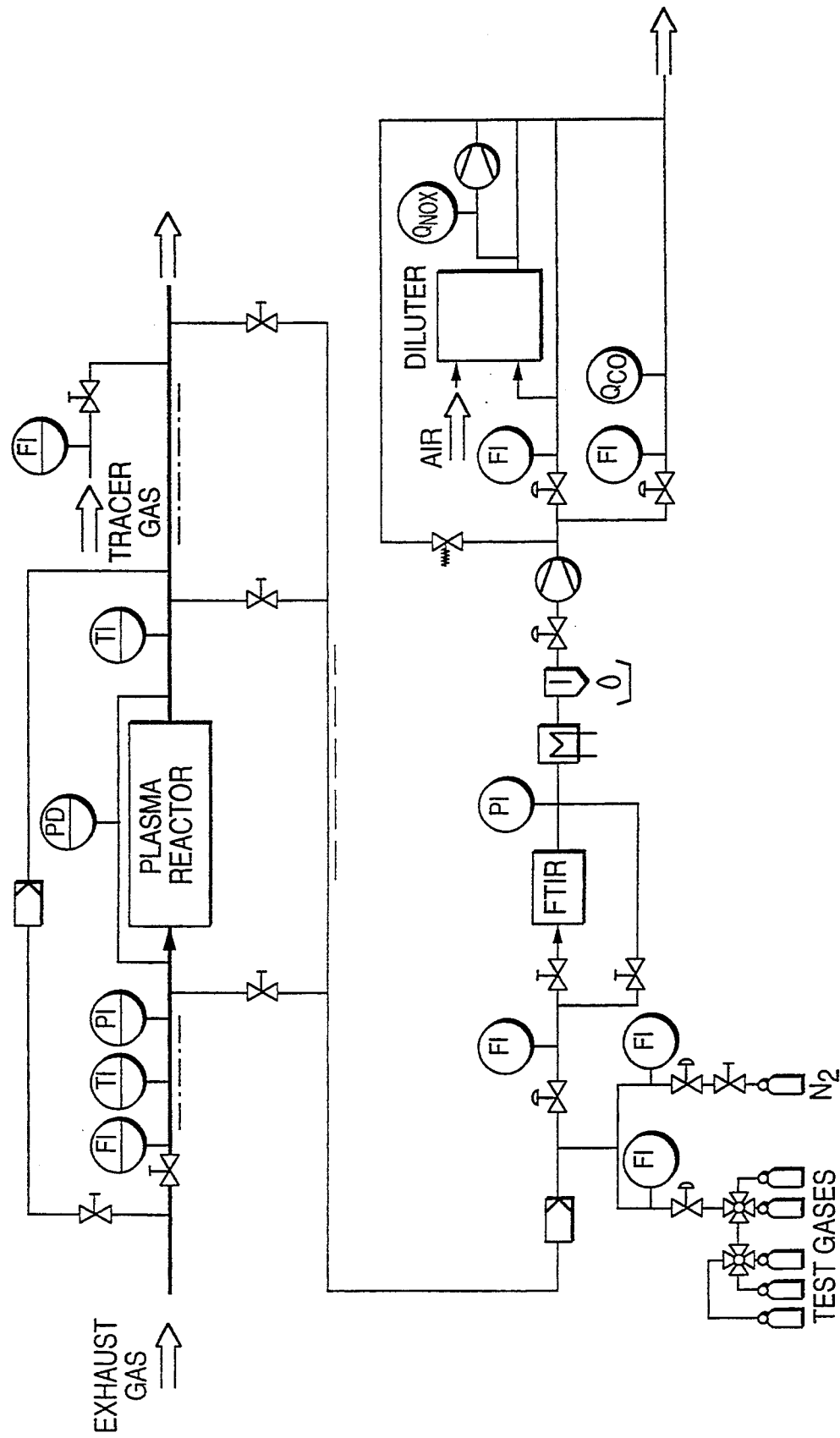
FIG. 5 is a process flow chart for the black reduction.

FIG. 5 shows a simplified process flow chart of the experimental system.

Figure 6:
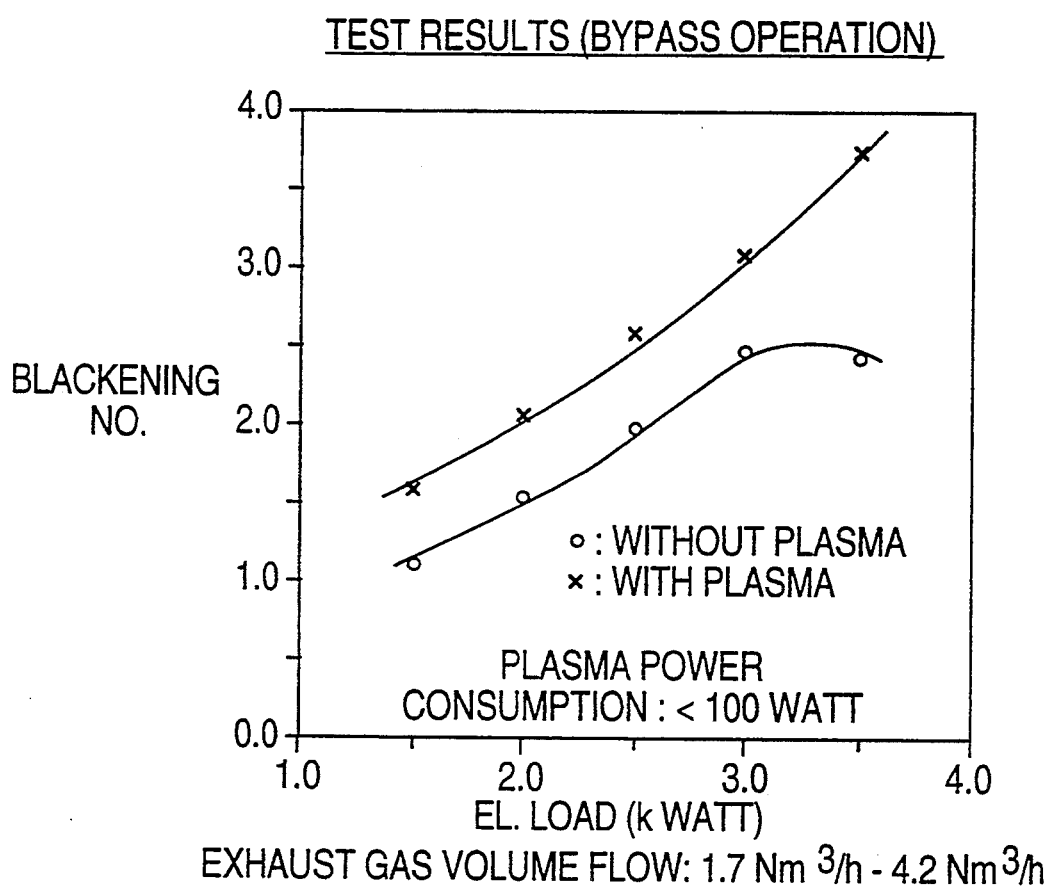
FIG. 6 is a diagram of the test results.

FIG. 6 illustrates a summarizing representation of the plasma-induced particle reduction in the useful load range of the diesel engine for the example of the generating of the plasma zone in a 2.46 GHz R-26 microwave wave guide.

The active plasma zone contains a reactive volume of approximately 0.5 $cm^3$.

In the case of full-load conditions, this corresponds to a mean dwell time of the particle-containing exhaust gas in the plasma zone of $4.5 \cdot 10^{-4}$ sec (0.45 msec). The temperature behind the plasma zone was determined to be 623K (stationary).

In the case of a full load, the degree of reduction relative to the total emitted carbon black mass is 40%.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for the continuous removal of carbon particles, comprising the steps of:
   operating a stationary oxidative plasma process to produce plasma, wherein the operating step is achieved by microwave fields; and
   achieving a carbon particle burn-up in the excess oxygen of combustion processes using a fuel with atmospheric air.

2. A process according to Claim 1, wherein microwave magnetrons of 2.46 GHz are used in the process.

3. A process according to claim 1, wherein plasma production takes place in a rectangular wave guide in the $H_{10}$-mode.

4. A process according to claim 1, wherein plasma production, excited in a cavity resonator in the $E_{010}$-mode, takes place from a rectangular wave guide in the $H_{10}$-mode by iris coupling.

5. A process according to claim 1, wherein a short-time high-frequency pulse is used for plasma ignition.

6. A process according to claim 1, wherein for a plasma ignition, electric charge carriers are made available by one of flame ionization, field emission, corona discharge, spark discharge, arc discharge or ionizing corpuscular and electromagnetic radiation.

7. A process according to claim 1, wherein said carbon particles are soot produced from said combustion processes.

8. A process according to claim 1, wherein additional external electric and magnetic fields are provided around said plasma.

* * * * *